Oct. 24, 1961  H. WEINSTEIN  3,005,897
HEATER CONTROL CIRCUIT FOR ALLOYING APPARATUS
Filed May 7, 1959
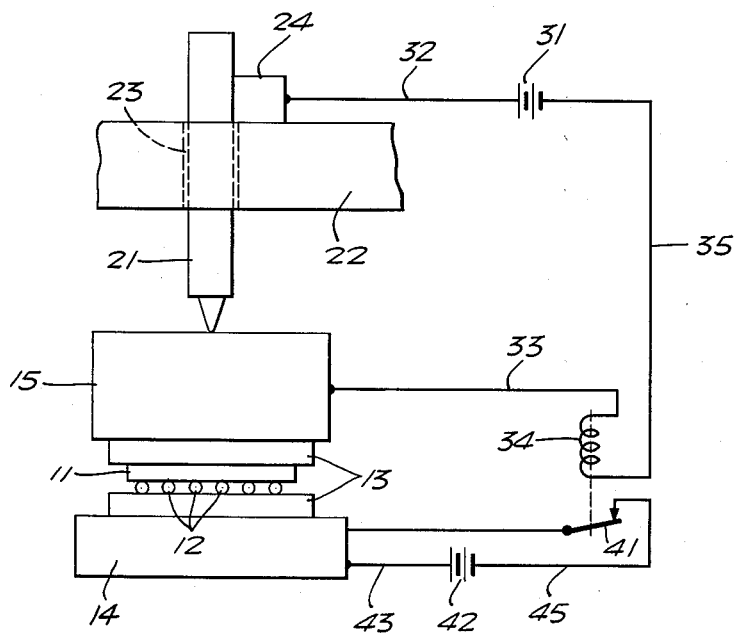
HAROLD WEINSTEIN
INVENTOR.
BY
ATTORNEY United States Patent Office 3,005,897
Patented Oct. 24, 1961

3,005,897
HEATER CONTROL CIRCUIT FOR ALLOYING APPARATUS
Harold Weinstein, Chicago, Ill., assignor to Hoffman Electronics Corporation, a corporation of California
Filed May 7, 1959, Ser. No. 811,709
6 Claims. (Cl. 219—20)

The present invention relates to circuit breakers, and more particularly to circuit breakers for stopping an alloying process when the alloying is completed.

The process of forming alloy junctions in semiconductor devices is very difficult and exacting. It is necessary to apply a precise amount of heat for a precise amount of time in order to obtain a satisfactory alloy junction, and it is desirable to be able to do so automatically.

It is an object of the present invention, therefore, to provide a novel circuit breaker.

It is another object of the present invention to provide a simple circuit breaker that can automatically stop an alloying process when the alloying is completed.

According to the present invention, when a semiconductor alloying process is completed, a resulting diminished dimension of the semiconductor device causes a weight to move, thereby breaking or making a circuit and automatically stopping the alloying process.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which, The sole figure is a side view of a circuit breaker and its associated electrical circuit according to the present invention.

Referring now to the drawing, the sole figure shows silicon semiconductor 11 resting upon aluminum strips or spheres 12. Semiconductor 11 and spheres 12 are held in position by the upper and lower jaws of jig 13, which is in contact with heater 14. Metal weight 15 rests upon jig 13. Metal rod 21 is supported in arm support 22 by bushing 23 and is free to slide up and down through arm support 22. Metal rod 21 is prevented from sliding under its own weight by magnet 24. The operation of the circuit breaker will now be described.

Metal rod 21 is lowered until it makes contact with metal weight 15, thereby completing the electrical circuit comprising battery 31, conductor 32, magnet 24, metal rod 21, metal weight 15, conductor 33, relay coil 34, conductor 35, and battery 31. When relay coil 34 is energized, it closes relay contact 41, thereby completing the electrical circuit comprising battery 42, conductor 43, heater 14, conductor 44, relay contact 41, conductor 45, and battery 42. When heater 14 is energized, it heats spheres 12 and semiconductor 11 so that spheres 12 melt and alloying takes place. When this occurs, the vertical dimension of spheres 12 will decrease, and weight 15 will fall. When weight 15 falls it loses contact with rod 21, which is held slidably in place by magnet 24, and relay coil 34 is no longer energized. When this occurs, relay contact 41 breaks the heating circuit, and heater 14 is turned off. Thus, the alloying process is automatically stopped when the alloying is completed.

When particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Apparatus for automatically stopping an alloying process when the alloying is completed, comprising: a vertically movable metallic member; a support member for supporting said movable member and permitting it to move only when an external force is applied to said movable member; a heater member for causing said alloying; a metallic weight member for resting upon a semiconductor-alloying material combination; and an electrical circuit that is closed only when said movable member makes contact with said weight member, said heater member heating said semiconductor-alloying material combination and causing said alloying only when said circuit is closed, the height of said combination decreasing when said alloying is completed, and said weight member dropping because of gravity when said height decreases, thereby breaking said circuit.

2. Apparatus as defined in claim 1 in which said support member includes a magnet for holding said movable member in place.

3. Apparatus as defined in claim 2 in which said electrical circuit comprises a source of potential, a relay, and a heating circuit, said potential energizing said relay only when said movable member makes contact with said weight member, said relay closing said heating circuit only when said relay is energized, and said heating circuit raising the temperature of said heater member only when said heating circuit is closed.

4. Apparatus for automatically stopping an alloying process when the alloying is completed, comprising: a movable member; a support member for supporting said movable member and permitting it to move only when an external force is applied to said movable member; a heater member for causing said alloying; a weight member for resting upon a semiconductor-alloying material combination; and an electrical circuit that is closed only when said movable member makes contact with said weight member, said weight member dropping when said alloying process is completed so as to no longer make contact with said movable member, and said heater member causing said alloying only when said circuit is closed.

5. Apparatus for automatically stopping an alloying process when the alloying is completed, comprising: a movable member; a support member for supporting said movable member and permitting it to move only when an external force is applied to said movable member; a heater member for causing said alloying; a weight member for resting upon a semiconductor-alloying material combination; and an electrical circuit coupled across said movable member and said weight member, said heater member heating said semiconductor-alloying material combination when said movable member is in contact with said weight member, said weight member moving when said alloying process is completed so as to no longer make contact with said movable member, and said electrical circuit causing said heater member to be turned off when said weight member no longer makes contact with said movable member.

6. Apparatus for automatically stopping an alloying process when the alloying is completed, comprising: a heater member; a weight member for resting upon a semiconductor-alloying material combination to be alloyed; and an electrical circuit that has first and second conditions, said heater member heating said semiconductor-alloying material combination and causing said alloying only when said circuit is in said first condition, an external dimension of said semiconductor-alloying material combination decreasing when said alloying is completed, and said weight member moving because of gravity when said external dimension decreases, thereby causing said circuit to be in said second condition.

References Cited in the file of this patent

UNITED STATES PATENTS

| | | |
|---|---|---|
| 1,994,629 | Arkema | Mar. 19, 1935 |
| 2,654,059 | Shockley | Sept. 29, 1950 |
| 2,705,768 | Kleimack et al. | Apr. 15, 1955 |
| 2,878,148 | Beale | Mar. 17, 1959 |